United States Patent
Koh et al.

[11] Patent Number: 6,166,830
[45] Date of Patent: Dec. 26, 2000

[54] INTEGRATED SCAN-TO-STORE APPARATUS

[76] Inventors: Chong S. Koh; Francis H. Koh, both of 7809 Bradley Blvd., Bethesda, Md. 20817

[21] Appl. No.: 09/108,375

[22] Filed: Jul. 1, 1998

[51] Int. Cl.[7] .................................................. H04N 1/024
[52] U.S. Cl. ............................................................ 358/473
[58] Field of Search .................................. 358/474, 494, 358/497

[56] References Cited

U.S. PATENT DOCUMENTS

| | | |
|---|---|---|
| 4,369,361 | 1/1983 | Swartz et al. . |
| 4,803,561 | 2/1989 | Kubota ................................ 358/285 |
| 4,831,457 | 5/1989 | Watanabe ............................. 358/256 |
| 5,075,539 | 12/1991 | Shiraishi ............................. 250/208.1 |
| 5,150,227 | 9/1992 | Koshiyouji ........................... 358/497 |
| 5,182,652 | 1/1993 | Stephenson, III ...................... 358/497 |
| 5,301,244 | 4/1994 | Parulski . |
| 5,402,208 | 3/1995 | Ohmura et al. ....................... 358/497 |
| 5,448,655 | 9/1995 | Yamagushi ............................ 382/304 |
| 5,544,045 | 8/1996 | Garland et al. . |
| 5,659,164 | 8/1997 | Schmid et al. . |
| 5,663,812 | 9/1997 | Pan . |
| 5,720,013 | 2/1998 | Uda et al. . |
| 5,752,075 | 5/1998 | Kikinis . |
| 5,870,624 | 2/1999 | Kikinis . |
| 5,917,616 | 6/1999 | Chou et al. ........................... 358/497 |

OTHER PUBLICATIONS

Microtek Press release, Nov. 2, 1998.

*Primary Examiner*—Jerome Grant, II

[57] ABSTRACT

The claimed integrated scan-to-store apparatus comprises of a single housing unit wherein a flatbed scanner, CPU, monitor, and storing means are disposed within. The apparatus allows images to be scanned and stored on a removable data/storage device.

13 Claims, 1 Drawing Sheet

INTEGRATED SCAN-TO-STORE APPARATUS

BACKGROUND

Current flat bed scanner systems are interfaced with separate computers and printers. Images are scanned and thereafter transmitted to the computer wherein the images are processed and displayed on the monitor screen. The images are subsequently stored as a graphics file such as tiff, jpeg, gif, etc. Images can be converted to a hard copy by means of a printer interfaced to the computer. Processing of scanned images are carried out by a multitude of machines such as fax machines, digital cameras, and copiers. These apparatuses and machines carry out the scanning and saving of the scanned images within separate units such as the apparatuses disclosed in U.S. Pat. No. 5,659,164. The scanner printer server apparatus disclosed in U.S. Pat. No. 5,720,013 selectively outputs scanned images. However, the apparatus uses separate units to carry out the scanning, processing, and storing of the scanned image. There is a need for a convenient, simple to use, integrated system. The number of papers needlessly wasted by superfluous copying can be greatly reduced if there existed a means to store images to a retrievable intermediate format which can later be printed after review; some images may never require conversion to a hard copy. The following disclosed invention allows images to be scanned, manipulated/adjusted, and stored to a removable storage device all within the confines of a single housing unit/body apparatus.

BRIEF DESCRIPTION

In a certain preferred embodiment, the claimed invention has within one unit; a scanning means, image to data conversion by means of a built in CPU, RAM, and, but not requiring, ROM, and a data/image storing means such as a DVD drive, disk drive or other data storage means. In a more preferred embodiment a miniature monitor screen is built into the unit so the scanned images can be observed on screen allowing adjustments such as resolution, contrast, and intensity controls to be made and subsequently stored to a data storage device.

DETAILED DESCRIPTION

Figure 1:
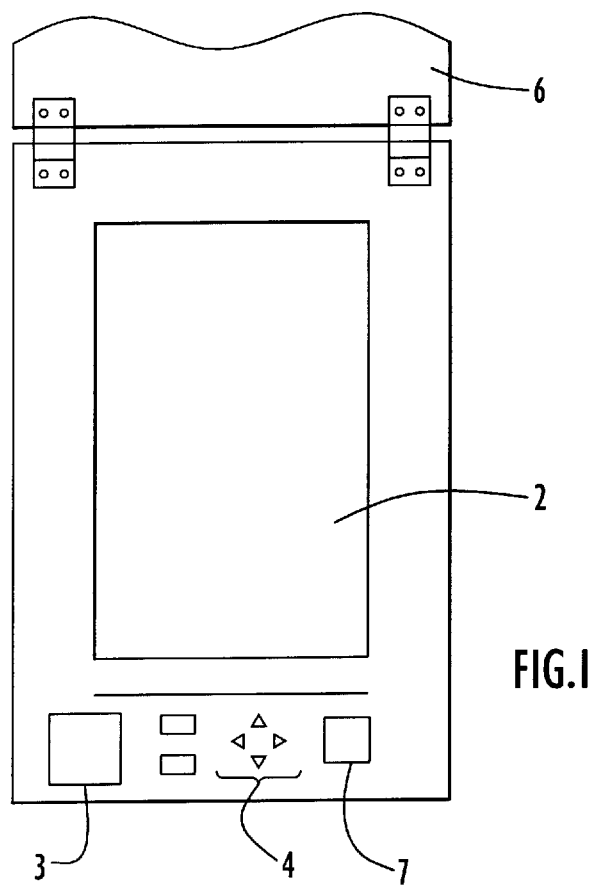
FIG. 1 shows an overview of the scan-to-store apparatus with the lid open.
Figure 2:
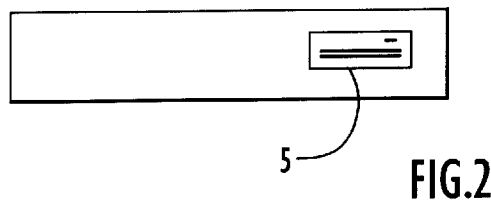
FIG. 2 shows a front profile of the apparatus where a image/data storage means is disposed within.
Figure 3:
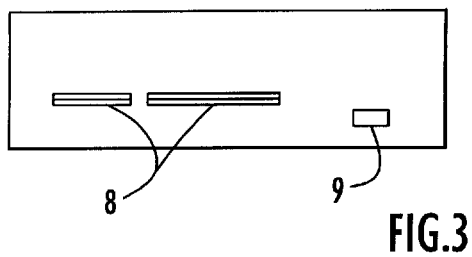
FIG. 3 shows a rear profile of the apparatus where the expansion ports and power jacks are located.

This integrated scan-to-store apparatus comprises of a flatbed-scanning region where a lid 6 is lifted thereby revealing the glass scanning surface 2 whereupon an image to be scanned is placed. In a more preferred embodiment is scanned and thereafter displayed on monitor/screen 3. The desired commands for controlling or making adjustments are made on control panel 4. Images are processed as a common graphic/image file and thereafter transferred to a cache memory buffer or directly to a removable data storing device 5. The data storing device may recieve storage device of various data formats. A high-powered CPU along with an extensive RAM and cache memory system allow for fast scanning and subsequent storage of scanned images. Ports 8 allow portable computers or external peripherals such as external drives, (e.g., data storage device) and printers to be interfaced with the apparatus. The apparatus may include serial, parallel or any other types of expansion ports. The power is supplied through the power jack 9.

Details and embodiments of the apparatus may be changed without defying the spirit and scope of the invention as outlined in the hereby-appended claims.

What is claimed is:

1. In a stand-alone scanning apparatus including a single housing having a too surface and an interior space defined beneath said top surface, a method of scanning and storing an image comprising the steps of:

(a) installing a control panel on said housing for entry of commands to control said apparatus;

(b) scanning an image placed within a scanning area of said apparatus to produce scanned image data via a scanner disposed within said housing interior space;

(c) processing said entered commands and controlling said scanner in accordance with said entered commands and;

converting said scanned image data to graphic/image file formats via a processor disposed within said housing interior space; and (d) storing said converted scanned image, via a data/image storage unit disposed in said housing interior space on a removable storage device inserted within said data/image storage unit.

2. The method of claim 1 wherein said apparatus further includes a monitor/screen, and said method further includes the step of:

(e) displaying information relating to said scanning and storing of said image on said monitor/screen.

3. The method of claim 1 wherein said apparatus further includes an adjustable lid, and step (b) further includes;

(b.1) selectively covering said scanning area via said lid.

4. A stand-alone scanning apparatus for scanning and storing an image comprising;

a single housing having a ton surface and an interior space defined beneath said top surface;

a control panel disposed on said housing and having input devices for entering commands to control said apparatus;

a scanner for scanning an image placed within a scanning area of said apparatus to produce scanned image data;

a processor for processing said entered commands and controlling said scanner in accordance with said entered commands and for converting said scanned image data to graphic/image file formats; and a data/image storage unit for storing said converted scanned image on a storage device removably disdosed within said storage unit;

wherein said apparatus is a self-contained unit having said scanner, processor and data/image storage unit disposed in said housing interior space.

5. The apparatus of claim 4 further including a monitor/screen to display information relating to said scanning and storing of said image.

6. The apparatus of claim 4 further including an adjustable lid for selectively covering said scanning area.

7. The apparatus of claim 4 further including ports for interfacing external peripherals.

8. The apparatus of claim 7 wherein said external peripherals include a portable computer.

9. The apparatus of claim 7 wherein said external peripherals include a data storage device.

10. The apparatus of claim 7 wherein said ports include at least one serial port.

11. The apparatus of claim 7 wherein said ports include at least one parallel port.

12. The apparatus of claim 4 wherein said storage unit accommodates removable storage devices of different formats.

13. The apparatus of claim 4 wherein said input devices include push button controls.

\* \* \* \* \*

UNITED STATES PATENT AND TRADEMARK OFFICE
CERTIFICATE OF CORRECTION

PATENT NO.     : 6,166,830                                              Page 1 of 1
DATED          : December 26, 2000
INVENTOR(S)    : Chong S. Koh and Francis H. Koh It is certified that error appears in the above-identified patent and that said Letters Patent is hereby corrected as shown below:

Column 2,
Line 9, replace "too" with -- top --.
Line 40, replace "ton" with -- top --.

Signed and Sealed this

Fifteenth Day of November, 2005

JON W. DUDAS
*Director of the United States Patent and Trademark Office*